United States Patent [19]

Gillan et al.

[11] Patent Number: 4,984,640

[45] Date of Patent: Jan. 15, 1991

[54] POWER POST DRIVER AND HAMMER

[76] Inventors: Leland E. Gillan, 6065 Xenophon St., Arvada, Colo. 80004; Robert J. Wagner, Rte. 1, Box 35H, Commerce City, Colo. 80022

[21] Appl. No.: 484,580

[22] Filed: Feb. 26, 1990

[51] Int. Cl.[5] ............................................ B23B 45/16

[52] U.S. Cl. .................................. 173/123; 173/114; 173/128; 405/232; 74/55

[58] Field of Search ............... 173/114, 122, 123, 124, 173/128, 129, 130, 132, 133; 405/232; 74/55

[56] References Cited

U.S. PATENT DOCUMENTS 3,023,628 3/1962 Heppner ........................ 173/122 X

*Primary Examiner*—Hien H. Phan

*Assistant Examiner*—Willmon Fridie, Jr.

[57] ABSTRACT

A compact power hammer that can be used to drive post easily and safely by one person as well as for use with other impact tools. The invention is comprised of a cam (26) lifting a hammer (44) and dropping it onto an anvil (30). The impact on the anvil (30) is transferred to the post (56) or impact tool by way of the center tube head (58). The center of gravity of the impact device (10) is below and in the post or impact tool 56.

2 Claims, 1 Drawing Sheet

POWER POST DRIVER AND HAMMER

BACKGROUND

1. Field of Invention

Figure 1:
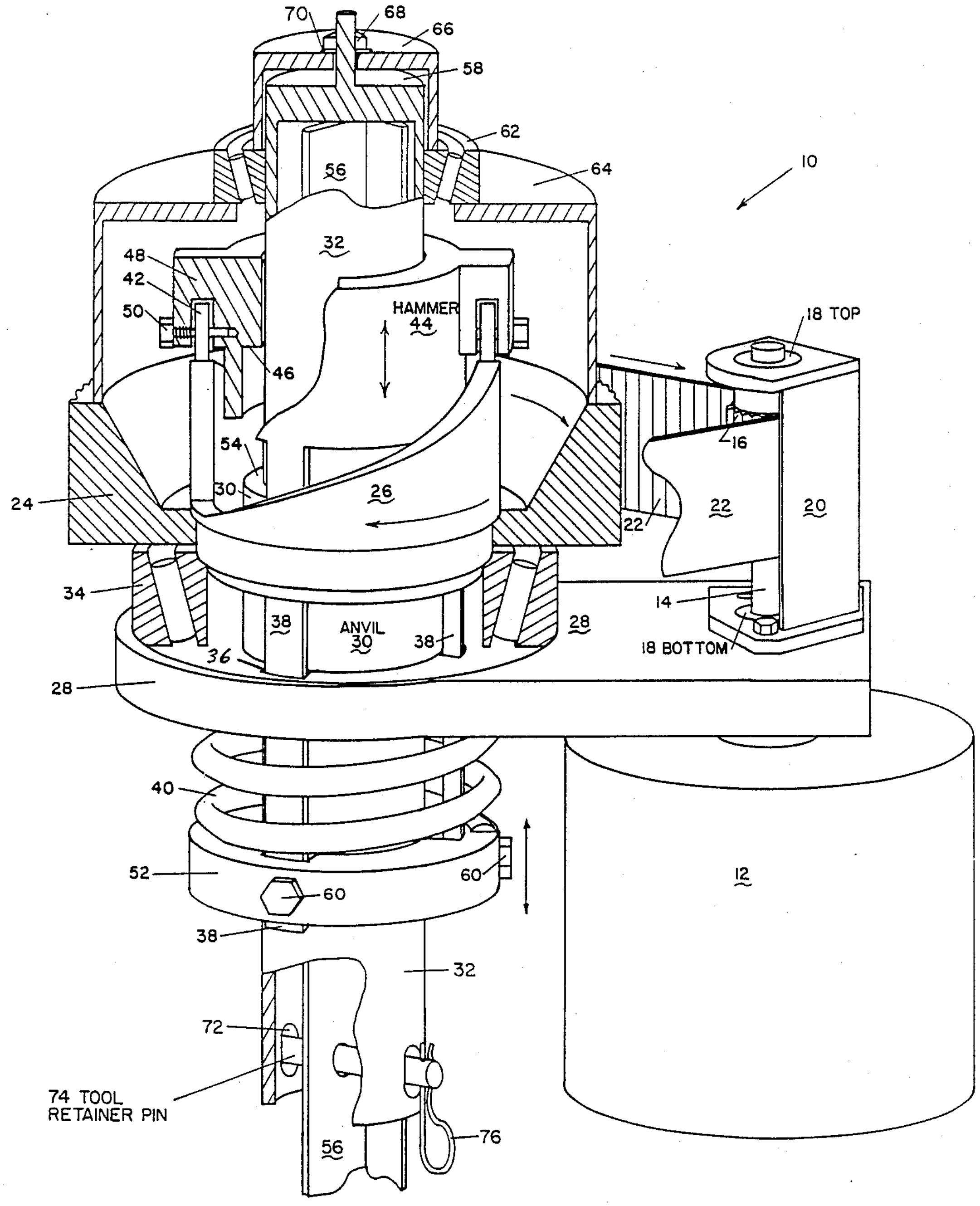

This invention relates generally to power tool driving or impacting, and more specifically to a power post driver or impact hammer utilized for driving posts, drilling in rock and concrete, forming metal and similar application.

2. Description of Prior Art

Various designs for power impact tools are described in the prior art and a couple mention specifically fence post drivers. Generally, prior art devices incorporate a reciprocally mounted spring based hammer element which is lifted by a rotating cam against the force of the spring and suddenly permitted to drop by virtue of an abrupt shoulder formed in the cam profile. Examples of such arrangements are set forth in the Strobed U.S. Pat. No. 1,925,289; the Rodrigues U.S. Pat. No. 1,029,824; the Bugg U.S. Pat. No. 2,492,840; the Sieber U.S. Pat. No. 2,888,246; the Jansen et al U.S. Pat. No. 3,256,946; the Saari U.S. Pat. No. 3,924,692; the Whitworth U.S. Pat. No. 4,082,152; the Wagner U.S. Pat. No. 3,937,286; and the Wilson U.S. Pat. No. 4,171,024.

In each of the foregoing designs as well as many other designs, the impact mechanism is placed above the work tool such as a chisel or fence post.

In the application where a fence post is driven into the ground or other similar application these designs fall far short of being acceptable.

To illustrate the disadvantages, consider driving a six foot high steel tee fence post into the ground. With prior art the impact device must be some how be held on top of the post while the post is also held in the vertical position. This puts the operator reaching high above him, if he is tall enough to start with, in a precarious, unsafe position or standing on something next to the post. The operator must run the power impact device with a weak or no coupling between the fence post and power impact device while holding the post vertical. Practically all hand held, power post drivers do not work. Several tractor or truck mounted power post impact driving devices have been invented such as the Deike, U.S. Pat. No. 4,124,081.

Many people still use the physically demanding post driver made up of a pipe with one end capped off. The pipe is placed over the post and is then manually lifted and slammed down onto the post until the post is driven to the required depth. In remote locations where it's not possible to drive vehicles such as forests, power post drivers are not used due to the unwieldy and unsafe condition they create.

To summarize the disadvantages of prior art:

a. The center of gravity of all prior art is far above the top of the item to be impacted. For applications such as driving posts, all prior art has limited use and can be very unsafe.

b. The actual impact mechanism is located above the item to be impacted. Again, in applications such as with a post, the operator can be put in an unsafe, unwieldy position.

c. In applications such as driving fence posts, the operator must use manual tools, or heavy large equipment.

OBJECTS AND ADVANTAGES

This invention was designed to solve the problems of power driving fence posts in remote applications or for a single person operation without the use of additional equipment. This invention can be easily adapted to other more conventional uses such as a tamper or power chisel.

Accordingly, besides the objects and advantages of the power impact tool described in the above patent, several of the objects and advantages of the present invention are:

a. Using the example of driving fence posts, it puts the center of gravity within the post and well below the top of the post. This makes for a very safe and easily operated power impact tool. One man standing on the ground can easily control the machine and the post.

b. To have the impact means centered around the object to be impacted. In the example of the post this accomplishes two objects. The first is a very safe and stable operation. Second the impact energy is put axially into the top of the post with no concern for misalignment and loss of energy.

c. To be light weight and hand carried for remote applications. The invention can definately be hand carried and durable with its compact rugged design.

d. To be adaptable to different uses such as driving posts, tamping soil around posts or as a power chisel. This gives the invention versatility and added value to its owners.

Still further objects and advantages will become apparent from a consideration of the ensuing description and drawings.

DRAWINGS FIGURES

FIG. 1 shows all aspects of the invention.

REFERENCE NUMERALS IN DRAWINGS

10. Power Post Driver and Hammer Assemble
12. Motor
14. Drive Shaft
16. Sprocket
18. Drive Shaft Bearings
20. Drive Shaft Mount Bracket
22. Synchronous Tooth Belt
24. Cam Sprocket
26. Cam
28. Base Plate
30. Anvil
32. Center Tube
34. Cam Bearing
36. Base Plate Slots
38. Hammer Strut
40. Spring
42. Cam Ride Bearings
44. Hammer
46. Hammerhead
48. Cam Ride Bearing Mounts
50. Cam Ride Bearing Bolts
52. Spring Washer
54. Anvil Head
56. Fence Post (Or Impact Tool)
58. Center Tube Head
60. Hammer Strut Bolts
62. Cam Retainer Bearings
64. Cam Retainer 66. Bearing Retainer
68. Lock Nut
70. Lock Washer
72. Tool Retainer Slots
74. Tool Retainer Pin
76. Tool Retainer Clip

DESCRIPTION—FIG. 1

Referring to FIG. 1, there is indicated generally by numeral 10 the power impact tool of the present invention.

A motor 12 drives the invention by supplying rotary power. The motor is bolted to the base plate by adjustable mounting brackets. A conventional drive shaft 14 is turned by the motor 12 and in turn, turns belt sprocket 16. The drive shaft 14 and sprocket 16 are all mounted and adjustable in the conventional ways by bolting through the drive shaft mounting bracket 20 with drive shaft bearings 18 top and bottom. The drive shaft mount bracket 20 is secured to the base plate 28. The synchronous belt 22 is then driven by sprocket 16 in a conventional way. Cam sprocket 24 transmits this rotary power to the cam 26. The drive system described up to this point could be changed to gears, chains or other rotary power devices.

The base plate 28 must accomplish several tasks. As previously mentioned base plate 28 secures the drive shaft mounting bracket and motor. Cam bearing 34 sets in the base plate centered around the center tube 32. Three slots 36 are cut in the base plate 28 on the inside of cam bearing 34 and the out side of anvil 30. These slots 36 accommodate the hammer struts 38 longitudinal movement while preventing the hammer 44 from turning. The base plate 28 counters spring 40 force as it is compressed. Anvil 30 and center tube 32 are all permanently attached to the base plate 28.

Cam bearing 34 must accommodate radial loads from the drive means, in specific, the cam sprocket 24, and thrust loads from the spring 40 compression through the cam 26. Cam bearing 34 can be of any bearing system able to carry the radial and thrust loads present.

The cam 26 is cut from a cylinder with two symmetric lobes. The symmetric lobes on the cam 26 are made up of three sections. The short flat bottom section turns into a relatively long ramp and finally a steep drop that is parallel with the cam 26 axis.

Hammer 44 has three main parts. The hammerhead 46 providing the impact surface around the perimeter of the center tube 32. Cam follower assemble comprised of the cam ride bearing mounts 48 that hold the cam ride bearings 42 with bolts 50. Bolts 50 have the outer threads removed to fit the inside diameter of cam ride bearings 42 and the inner section of the cam ride bearing mounts 48. The third section of the hammer are the three hammer struts 38 that transmit the spring compression force for the impact. The hammer struts 38 are bolted to the spring washer 32 by means of hammer strut bolts 60. The hammer struts 38 are cut in an arc to conform with the circular shape of the hammer 44, anvil 30, cam 26 and cam bearings 34.

The anvil 30 is securely attached to the base plate 28 and center tube 32. The anvil head 54 is perpendicular to its axis and around the perimeter of the anvil. The anvil 30 transmits the impact to the center tube 32.

The center tube 32 is attached to the anvil 30 and base plate 28, and has one end closed called the center tube head 50. Center tube 32 accepts the item to be impacted such as a fence post 56. The center tube 32 transmits the impact on anvil 30 to the center tube head 58 and thus the fence post 56. Attached to the center tube head 58 is a stud to hold down the bearing retainer 66.

Spring washer 52 has two purposes. First, it retains the spring 40 to the hammer struts 38 by means of the hammer strut bolts 60. Second, the spring washer's 52 inside diameter rides against the center tube holding the hammer impact surface square to the anvil. Therefore, slots are cut into the spring washer 52 to accommodate the hammer struts 38.

To hold the cam 26 cam sprocket 24 and cam bearing 34 to the base plate 28 while they rotate, cam retainer 64, cam retainer bearing 62, and bearing retainer 66 are bolted down with nut 68 and lock washer 70.

At the base of the center tube 32 there are two tool retainer slots 72. These slots are used to hold impact tool 56 in the center tube with tool retainer pin 74 and tool retainer clip 76.

From the description above, a number of advantages of this power post driver and impact hammer assembly 10 become evident:

a. The center of gravity is below the top of the fence post 56 and located within close proximity of the post.
b. The impact of the hammer 44 on to the anvil 30 is transmitted symmetrically to the top of the post with the actual impact around the post.
c. The invention is compact and can be made light weight.
d. It is easy to insert other impact tools 56 such as a tamping tool into the center tube 32.

OPERATION—FIG. 1

The manner of using the power post driver and impact hammer assembly 10 depends somewhat on the needs of the user. For tall post applications, the power post driver and hammer 10 should be placed around the post 56 while hoizontal and then the post stood vertically for driving into the ground. For shorter applications such as tamping, a bar with a foot on the end can be placed into the center tube 32 and held in place with tool retainer pin 74 and tool retainer clip 76.

The internal operation of the invention is powered by a conventional rotary motion motor 12 such as an electric motor or internal combustion engine. The speed reducing mechanism is again through conventional system such as the drive shaft mount bracket 20, drive shaft bearings 18 top and bottom, drive shaft 14, and synchronous tooth belt 22. Other drive forms could be applied limited only by the capability of the drive mechanism in terms of power transmitted and the speed they can turn.

Energy for the impact of this invention is transmitted by the rotation of cam sprocket 24 to the cam 26. As the cam sprocket 24 rotates on cam bearing 34 the attached cam 26 also rotates lifting hammer 44 by means of the cam follower assembly. The cam follower assembly is made up of cam ride bearing mount 48, cam ride bearing 42, and cam ride bearing bolt 50 that is permanently attached to the hammer 44. The hammer 44 compresses spring 40 through the hammer struts 38. The hammer struts pass through the base plate preventing the hammer from rotating.

As the cam 26 is turned and the cam ride bearings 42 reach the top of the cam the hammer struts 38 have compressed the spring 40 to obtain the desired striking potential energy. Then hammer 44 is slammed down on the anvil 30 as the cam 26 is turned past its high point with an abrupt drop in the cam 26. Cam ride bearings 42 are stopped short of striking the cam 26 at its low point by the impact of the hammer 44 on to anvil 30. The striking surface areas of the hammer head 46 and the anvil head 54 must be sized to prevent yielding of the material with impact created by spring 40. It is essential that the hammer head 46 strikes the anvil head 54 squarely such that no yielding of the heads takes place.

To assure the hammer head 46 strikes the anvil head 54 squarely, the spring washer 52 has been designed to slide on center tube 32. The spring washer 52 serves two purposes by being bolted to the hammer struts 38. First the spring washer 52 allows the hammer struts 38 to compress spring 40. Second it holds the hammer struts 38 centered around the center tube 32 and thus the hammer head 46 paralled with the anvil head 54.

To provide impact transfer from anvil head 54 to the fence post 56, the anvil 30 is attached to the center cylinder 32. The impact is then transferred to the center tube head 58 and thus to the fence post 56.

The base plate 28 connects the working parts together and transfers the spring 40 force to the hammer 44.

To hold the cam bearing 34 in place as the cam 26 rotates through its cycles of load and no load, the cam retainer 64 is set onto the cam sprocket 24. The cam retainer 64 is allowed to rotate by cam retainer bearing 62. This cam retainer bearing 62 slips over the center tube 32 and is held in place by the bearing retainer 66 which is bolted to the center tube head 58.

A means to attach the power hammer to a tool such as a tamper is necessary to provide easier handling. To secure impact tools, tool retainer slots 72 are installed on the lower portion of the center tube. Tool retainer pin 74 is slid through the tool retainer slots 72 and a hole in the tool and held in place with tool retainer clip 76. In this way the impact tool will derive its impact force from the center tube head 58 and not the tool retainer pin 74.

From the operation shown in FIG. 1 and described above the invention's advantages become clear and are in part as follows:

a. It has the center of gravity below the top of the fence post or impact tool 56 and for practical purposes, within the fence post or impact tool 56 for ease of use in different applications such as pounding fence post.

b. It places the impact force on the tool at its top yet the impact of the hammer 44 on the anvil 30 itself is below the top of the post making a very stable power hammer.

c. It can be made very compact and light weight.

d. It provides for working with a variety of tools making the power hammer more versatile and useful for its owner.

All though the description above contains many specifications these should not be construed as limiting the scope of the invention but as merely providing illustrations of some of the presently preferred embodiments of this invention.

Thus the scope of the invention should be determined by the appended claims and their legal equivalents, rather than by the examples given.

We claim:

1. A power driver and hammer comprising in combination:

a. a tubular member with one end capped off where by a portion of a post or an impact tool is inserted inside said tubular member to the point of contact with the capped end of said tubular member and holds the post or tool in place with gravity or a retaining mechanism;

b. a hammer element surrounding the perimeter of said tubular member and sliding on the said tubular member in a reciprocating motion;

c. a cylindrical cam having a cam profile including a rising portion terminating in an abrupt drop, said cylindrical cam being concentrically mounted for rotation about said tubular member as an axis;

d. a spring surrounding the perimeter of said tubular member;

e. a cam follower assembly connected to said hammer element and connected to said spring, said spring urging said cam follower assembly against said cam profile;

f. means for rotating said cylindrical cam about said tubular member;

g. an anvil element surrounding and attached to the perimeter of said tubular member, and situated to be struck by said reciprocating hammer element evenly around the perimeter of said tubular member, conveying said hammer element striking energy to said anvil, and further transmitting the said hammer element energy to the capped end of said tubular member and to said post or said impact tool; whereby the center of gravity of said power post driver and hammer is within, for practical purposes, said post or said impact tool, and the impact of said hammer onto said anvil surrounds said post or said impact tool.

2. The power post driver and hammer of claim 1 wherein said hammer element impacts directly onto an impact tool surrounding said tubular member.

* * * * *